United States Patent
Takehara

(10) Patent No.: US 12,434,664 B2
(45) Date of Patent: Oct. 7, 2025

(54) VERIFICATION OF VEHICLE OWNERSHIP FOR ACCESSING VEHICLE DATA AND SOFTWARE

(71) Applicant: Honda Motor Co., Ltd., Tokyo (JP)

(72) Inventor: Yozo Takehara, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 18/457,539

(22) Filed: Aug. 29, 2023

(65) Prior Publication Data

US 2025/0074356 A1    Mar. 6, 2025

(51) Int. Cl.
  *B60R 25/24*    (2013.01)
  *B60R 25/04*    (2013.01)
  *G07C 9/00*    (2020.01)

(52) U.S. Cl.
  CPC .............. *B60R 25/24* (2013.01); *B60R 25/04* (2013.01); *G07C 9/00309* (2013.01); *B60R 2325/205* (2013.01); *G07C 2009/00793* (2013.01); *G07C 2209/08* (2013.01); *G07C 2209/63* (2013.01)

(58) Field of Classification Search
  None
  See application file for complete search history.

(56) References Cited

U.S. PATENT DOCUMENTS

| | | | |
|---|---|---|---|
| 7,425,886 B2 * | 9/2008 | Yoshii | B60R 25/24 340/5.31 |
| 9,911,255 B2 * | 3/2018 | Lee | G07C 9/27 |
| 10,332,124 B2 * | 6/2019 | Avary | H04W 4/70 |
| 10,814,833 B1 * | 10/2020 | Goetzinger | B60R 25/23 |
| 10,850,706 B2 * | 12/2020 | Hiruta | B60R 25/24 |
| 11,288,903 B2 | 3/2022 | Link | |
| 11,297,499 B2 | 4/2022 | Givens | |
| 11,400,887 B2 | 8/2022 | Luchner | |
| 2006/0279401 A1 * | 12/2006 | Yoshii | B60R 25/24 340/5.72 |
| 2012/0313796 A1 * | 12/2012 | Lee | B60Q 1/52 701/2 |

(Continued)

FOREIGN PATENT DOCUMENTS

| | | |
|---|---|---|
| CN | 107256584 A | 10/2017 |
| CN | 108259447 A | 7/2018 |

(Continued)

*Primary Examiner* — Carlos Garcia
(74) *Attorney, Agent, or Firm* — Aaron Fong; American Honda Motor Co., Inc.

(57) ABSTRACT

An electronic device and method for verification of vehicle ownership for accessing vehicle data and software is provided. The electronic device receives, via a user device, a request to access a software application associated with a vehicle that is in a first operational state. The electronic device transmits, to the user device, first information that causes the user device to render one or more action items associated with the request. Based on the transmission, the electronic device detects an event that is associated with a change in an operational state of the vehicle from the first operational state to a second operational state. The electronic device verifies the request based on the detection of the event and transmits, to the user device, second information that confirms the verification of the request.

20 Claims, 6 Drawing Sheets

(56) References Cited

U.S. PATENT DOCUMENTS

| | | | | |
|---|---|---|---|---|
| 2013/0317693 A1* | 11/2013 | Jefferies | ............ | G06Q 30/0645 |
| | | | | 701/31.5 |
| 2015/0212850 A1* | 7/2015 | Little | ................. | G06F 16/2365 |
| | | | | 707/703 |
| 2020/0307515 A1* | 10/2020 | Hiruta | ..................... | G06F 21/31 |
| 2021/0211432 A1 | 7/2021 | Li et al. | | |
| 2022/0252410 A1 | 8/2022 | Chmeiseh et al. | | |
| 2023/0177900 A1* | 6/2023 | Hassani | .................. | B60R 25/01 |
| 2024/0112515 A1* | 4/2024 | Dong | .................... | G06F 9/4406 |
| 2025/0074356 A1* | 3/2025 | Takehara | ................ | B60R 25/04 |

FOREIGN PATENT DOCUMENTS

| | | | |
|---|---|---|---|
| CN | 108944795 | A | 12/2018 |
| CN | 110061984 | B | 3/2022 |
| CN | 114980030 | A | 8/2022 |
| CN | 112738770 | B | 4/2023 |
| DE | 102019116490 | A1 | 12/2020 |
| GB | 2529388 | A | 2/2016 |
| KR | 20210007499 | A | 1/2021 |
| WO | 2018082832 | A1 | 5/2018 |
| WO | 2019185019 | A1 | 10/2019 |
| WO | 2019202227 | A1 | 10/2019 |
| WO | 2022237369 | A1 | 11/2022 |
| WO | 2023064820 | A1 | 4/2023 |

\* cited by examiner

VERIFICATION OF VEHICLE OWNERSHIP FOR ACCESSING VEHICLE DATA AND SOFTWARE

BACKGROUND

Advances in in-vehicle computing systems have resulted in connectivity modules and accompanying software that seamlessly integrate in-vehicle systems with user devices, most notably smartphones. This integration allows users to control various vehicle functions via their smartphones, from determining the vehicle's location to adjusting multimedia settings. Although data security and potential vulnerabilities remain concerns, the associated software ensures the legitimacy of these connections through robust authentication procedures. However, this introduces the challenge of protecting confidential data and preventing unauthorized access. Even with strict authentication, there is still a risk of compromised information or device theft, which could lead to vehicle vulnerabilities. As these technologies evolve, balancing the convenience of integration with the imperative of data protection becomes increasingly important.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for verification of vehicle ownership for accessing vehicle data and software is provided. The electronic device may include circuitry that may receive, via a user device, a request to access a software application associated with a vehicle. The vehicle may be in a first operational state. On reception of the request, the circuitry may transmit first information to the user device. The first information may cause the user device to render one or more action items associated with the received request. Based on the transmission, the circuitry may detect an event. The event may be associated with a change in an operational state of the vehicle from the first operational state to a second operational state. The circuitry may verify the request based on the detection of the event and may transmit second information to the user device. The second information may confirm the verification of the received request.

According to another embodiment of the disclosure, a method of verifying vehicle ownership for accessing vehicle data and software is provided. The method may include receiving, via a user device, a request to access a software application associated with a vehicle. The vehicle may be in a first operational state. The method may further include transmitting first information to the user device. The first information may cause the user device to render one or more action items associated with the request. The method may further include detecting an event that is associated with a change in an operational state of the vehicle from the first operational state to a second operational state. The detection of the event may be based on the transmission of the first information. The method may further include verifying the request based on the detection of the event and transmitting second information to the user device. The second information may confirm the verification of the request.

According to another embodiment of the disclosure, a non-transitory computer-readable medium is provided. The non-transitory computer-readable medium may have stored thereon computer-implemented instructions that, when executed by an electronic device, causes the electronic device to execute operations. The operations may include receiving, via a user device, a request to access software associated with a vehicle that may be in an OFF state. The operations may further include transmitting, to the user device, first information that may cause the user device to render a verification request. The operations may further include detecting, based on the transmission, a change in an operational state of the vehicle from the OFF state to an ON state. The operations may further include confirming the request when the change is detected. The operations may further include transmitting, to the user device, second information that may confirm the request.

Figure 1:
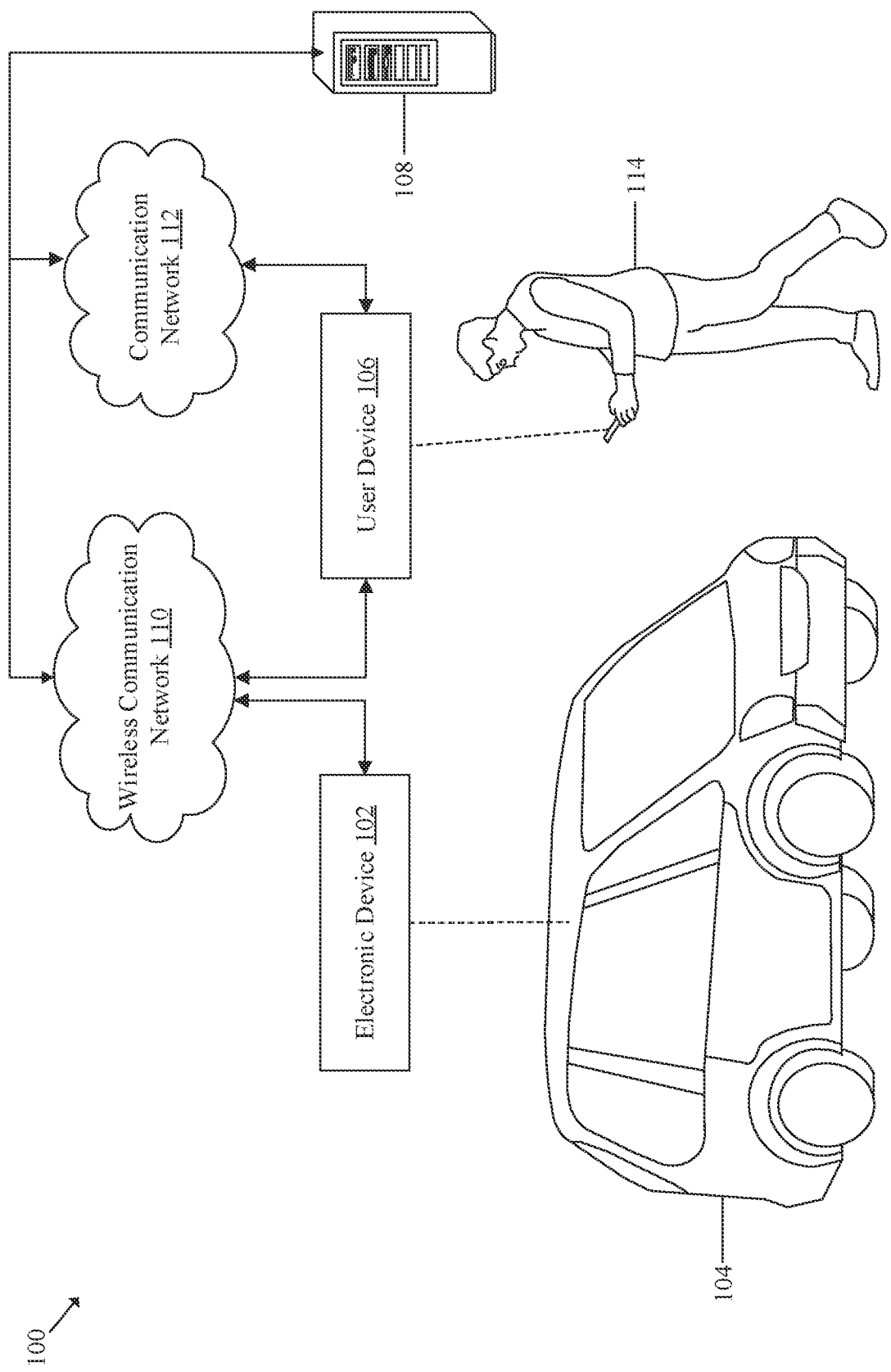
FIG. 1 is a block diagram that illustrates an exemplary network environment for verification of vehicle ownership for accessing vehicle data and software, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed electronic device and method for verification of vehicle ownership for accessing vehicle data and software. Exemplary aspects of the disclosure may provide an electronic device that may be included in the electronic device and configured to verify requests to establish a user as an owner or a primary user of a vehicle, add one or more users as secondary users, transfer ownership of the vehicle from a first user to a second user, or enable the primary user or the one or more secondary users to access the vehicle data and associated software based on verification of the requests. The requests may be received from user devices associated with the primary user or the one or more secondary users. Based on the verification of the requests, the vehicle data and the software may be made accessible via the user devices. Specifically, the electronic device may receive, via a user device (e.g., a personal user device such as a smartphone, a wearable device, or a desktop), a request to access a software application associated with a vehicle. The vehicle may be in a first operational state (for example, an OFF state of ignition, a parked state, and/or a locked state). The electronic device may transmit, to the user device, first information (for example, instructions that may change an operational state of the vehicle) that may cause the user device to render one or more action items (that may be required to be executed) associated with the request. Based on the transmission, the electronic device may detect an event that may be associated with a change in an operational state of the vehicle from the first operational state to a second operational state (for example, an ON state of ignition, an unlocked state, or a mobile/unparked state). The electronic device may verify the request based on the detection of the event (i.e., a transformation of the operational state of the vehicle from the first operational state to the second operational state). Upon verification, the electronic device may transmit, to the user device, second information (for example, an indication that the request is valid or legitimate) that may confirm the verification of the request.

In some scenarios, the electronic device may receive a request to access software associated with the vehicle. The vehicle may be in an OFF state when the request is received. Upon the reception of the request, the electronic device may transmit, to the user device, first information that may cause the user device to render a verification request. The verification request may include one or more actions that may be required to be performed for triggering a change in the operational state of the vehicle. Thereafter, based on the transmission of the first information, the electronic device may detect a change in an operational state of the vehicle from the OFF state to an ON state. The rendering of the verification request (caused by the transmission of the first information) may cause the user to perform one or more actions, and such actions may lead to a change in the operational state of the vehicle. The electronic device may confirm the request to access the software associated with the vehicle when the change in the operational state is detected. Thereafter, the electronic device may transmit, to the user device, second information that may confirm the request to access the software. The confirmation of the request may indicate that the request is verified.

An in-vehicle computing system may include features that enable pairing a user device with the in-vehicle computing system. The pairing may be achieved using different versions of a software application which may be executable with the in-vehicle computing system and the user device. The pairing may facilitate integration of the user device and the in-vehicle computing system and may enable a user to access features of the user device (such as manage incoming and outgoing calls) via the in-vehicle computing system or view information (such as contact list and messages) stored in the user device based on a rendering of the information on a display associated with in-vehicle computing system. The pairing may further enable the user to control functions of the vehicle via the user device or retrieve information associated with the vehicle via the user device. A first version of the software in the user device may be used to issue and transmit commands to control the functions of the vehicle or to retrieve information, and a second version of the software in the in-vehicle computing system may be configured to receive the issued commands and execute the received commands. For example, a user may issue a command to control a power unit (to turn ON/OFF lights or alarm) of the vehicle or retrieve information associated with the vehicle, such as a location of the vehicle, a state of health of the vehicle, a fuel level, a charge level, a tire pressure, and so on.

The pairing required to achieve such an integration of the user device and the in-vehicle computing system may be based on a single or multi-factor authentication of the legitimacy of a pairing request. The authentication may be based on transmission of previously known confidential information, such as a password, a passphrase, a pin code, personal details of the user, or vehicle identification information to the in-vehicle computing system. In some scenarios, the authentication may be further based on the transmission of confidential information that may be instantly generated by the in-vehicle computing system and received only by the user device. To ensure that user devices of only legitimate users (owners) of the vehicle are paired with the in-vehicle computing system, it may be necessary for the legitimate users to maintain secrecy of the known or the instantly generated confidential information. Failing such, the information associated with the user device, or the vehicle can be compromised, and the vehicle may be vulnerable to theft. However, maintaining such secrecy may be challenging in certain scenarios such as theft or hacking of the user device, or a compromise of the confidential information. In such scenarios, unauthorized users may pair their devices to the vehicle using the confidential information (then compromised).

To address the aforementioned issues, the disclosed electronic device (which may be part of an in-vehicle computing system) may be configured to verify a request to access software associated with the vehicle based on a detection of a change in an operational state of the vehicle in addition to user authentication based on the confidential information. The triggering of the change may require a user to have physical access to the vehicle. The request to access the software may be received from a user device associated with the user and may indicate an intention of the user to pair the user device with the in-vehicle computing system (such as an in-vehicle infotainment system) to access to the software. Upon reception of the request, one or more instructions may be transmitted to the user device. The instructions may correspond to one or more action items that include triggering a change the operational state of the vehicle. The request may be verified based on a detection of a change in the operational state after the transmission of the instruction. The detection of the change may indicate, to the electronic device, that the user has a physical access to the vehicle, and that the user may be the owner of the vehicle. The electronic device may further indicate, to the user device, that the request has been verified based on the detection. Based on the verification of the request, the user (i.e., the owner of the vehicle) may access, via voice inputs or touch inputs to the user device, the software associated with the vehicle. The access to the software may allow the user to control functions (such as opening or closing of the door-units or power units) of the vehicle, update one or more multimedia settings, or access information (such as a location, a state of health, a state of charge, a tire pressure, and so on). The verification of requests for software may eliminate the vulnerabilities associated with traditional access control systems of the vehicle.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for verification of vehicle ownership for accessing vehicle data and software, in accordance with an embodiment of the disclosure. With reference to FIG. 1, there is shown a network environment 100. The network environment 100 may include an electronic device 102, a vehicle 104, a user device 106, and a server 108. The electronic device 102 may be included in or may be a part of the vehicle 104. The electronic device 102 may communicate with the user device 106 via a wireless communication network 110 and the server 108 via a communication network 112. In at least one embodiment, the user device 106 may communicate with the server 108 via the communication network 112. There is further shown a user 114 associated with the electronic device 102.

The electronic device 102 may include suitable logic, circuitry, interfaces, and/or code that may be configured to manage verification of a request received from the user device 106. The request may be received for accessing a software application associated with the vehicle 104 by use of the user device 106. By way of example, and not limitation, the request may correspond to at least one of a sign-in attempt, a sign-up/registration attempt, or a re-registration (as part of ownership transfer) attempt. In at least one embodiment, the electronic device 102 may transmit information to the user device 106 (directly or via an application server (for example, the server 108)) that may include a set of action items that may be required to be performed by the user 114 for the verification of the request. The electronic device 102 may verify the request based on a detection of a change in an operational state of the vehicle 104 from a first operational state to a second operational state. The change may require the user 114 to have a physical access to the vehicle 104. In at least one embodiment, the electronic device 102 may receive user inputs (from the user device 106) associated with a control of one or more elements of the vehicle 104 or acquisition of information related to the vehicle 104 after the verification of the request. Example implementations the electronic device 102 may include, but are not limited to, an electronic control unit (ECU) of the vehicle 104, an in-vehicle infotainment system included in the vehicle 104, a component of a telematics unit of the vehicle 104, a server that is communicatively coupled with a vehicle network associated with the vehicle 104, or a computer terminal that is wirelessly paired with the vehicle 104.

The vehicle 104 may be one of a non-autonomous vehicle, a semi-autonomous vehicle, or a fully autonomous vehicle, for example, as defined by National Highway Traffic Safety Administration (NHTSA). An exemplary representation of the vehicle 104 may be a four-wheeler vehicle that uses one or more distinct renewable or non-renewable power sources. Examples of the vehicle 104 may include, but are not limited to, an electric car, an internal combustion engine (ICE)-based car, a fuel-cell based car, a solar powered-car, or a hybrid car. It should be noted here that the vehicle 104 is shown as a four-wheeler vehicle (car) merely as an example in FIG. 1. The present disclosure may be also applicable to other types of vehicles, without a departure from the scope of the present disclosure.

The vehicle 104 may include a location sensor. The location sensor may include suitable logic, circuitry, and/or interfaces that may be configured to determine a current geo-location of the vehicle 104. Examples of the location sensor may include, but are not limited to, a Global Navigation Satellite System (GNSS)-based sensor of the vehicle 104. Examples of the GNSS-based sensor may include, but are not limited to, global positioning sensor (GPS), Global Navigation Satellite System (GLONASS), or other regional navigation systems or sensors.

The user device 106 may include suitable logic, circuitry, interfaces, and/or code that may be configured to receive information from the electronic device 102 or the server 108. Based on the received information, the user device 106 may render one or more action items (on a display associated with the user device 106) that may need to be performed to verify the request (to access the software application associated with the vehicle 104). The user device 106 may further receive information indicative of a successful verification of the requests. Based on the information, the user device 106 may transmit user inputs to the electronic device 102 (directly or via the server 108) to control functions of the vehicle 104 or to view information related to the vehicle 104. Examples of the user device 106 may include, but are not limited to, a computing device such as a tablet or a smartphone, a laptop, a wearable device, an internet of things (IoT) device, or a consumer electronic device.

The server 108 may include suitable logic, circuitry, interfaces, and/or code that may be configured to receive information from the electronic device 102 and transmit the received information to the user device 106. The information may include instructions that may need to be performed to trigger a change in an operational state of the vehicle 104 which, when detected, may lead to a successful verification of a request to access the software application associated with the vehicle 104. The server 108 may execute operations through web applications, cloud applications, Hypertext Transfer Protocol (HTTP) requests, repository operations, file transfer, and the like. Example implementations of the server 108 may include, but are not limited to, a database server, a file server, a web server, an application server, a mainframe server, a cloud computing server, or a combination thereof. In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as separate entities. In certain embodiments, the functionalities of the server 108 may be incorporated in its entirety or at least partially in the electronic device 102, without a departure from the scope of the disclosure.

The wireless communication network 110 may include a medium through which the electronic device 102, the user device 106, and other components of the vehicle 104 may communicate with each other. The wireless communication network 110 may be established in accordance with Institute of Electricals and Electronics Engineers (IEEE) standards for infrastructure mode (Basic Service Set (BSS) configurations), or in some specific cases, in ad hoc mode (Independent Basic Service Set (IBSS) configurations).

The wireless communication network 110 may be a Wireless Sensor Network (WSN), a Mobile Wireless Sensor Network (MWSN), a wireless ad hoc network, a Mobile Ad-hoc Network (MANET), a Wireless Mesh Network (WMN), a Wide Area Network (WAN), a Wireless Local Area Network (WLAN), a cellular network, a Long-Term Evolution (LTE) network, a Cellular Vehicle-to-Everything (C-V2X) network, a $5^{th}$ Generation New Radio, or an Evolved High Speed Packet Access (HSPA+), and the like. The wireless communication network 110 may operate in accordance with IEEE standards, such as 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11ay, 802.11az, 802.11 hr (high data rate), 802.11af (white space spectrum), 802.11-2007, 802.11-2008, 802.11-2012, 802.11-2016.

For a particular pair of nodes (e.g., the electronic device 102 and the user device 106), the wireless communication network 110 may be established to use a specific type of communication, such as a short-range communication or a long-range communication. The short-range communication may be a point-to-point communication, a point-to-point line-of-sight (LOS) communication, or a point-to-multipoint communication. Examples of protocols for the short-range communication may include, but are not limited to, Radio Frequency Identification (RFID), Wireless USB, Dedicated Short Range Communications (DSRC), and Near Field Communication (NFC) (e.g., NFC Peer-to-Peer), Bluetooth®, or Bluetooth® Low Energy (BLE). Other examples of protocols may include, but are not limited to, ZigBee, Personal Area Network (PAN), Wi-Max, Wireless Metropolitan Area Networks (WMAN), and Local Multipoint Distribution Service.

The communication network 112 may correspond to a communication medium through which the user device 106 and the server 108 may communicate with each other. The communication network 112 may be a wired connection or a wireless connection. Examples of the communication network 112 may include, but may not be limited to, the Internet, a cloud network, a Cellular or Wireless Mobile Network (such as a Long-Term Evolution and 5G New Radio), a Wi-Fi network, a PAN, a Local Area Network (LAN), or a Metropolitan Area Network (MAN). The user device 106 and the server 108 may be configured to connect to the communication network 112 in accordance with various wired communication protocols and wireless communication protocols. Examples of the wire and wireless communication protocols may include, but are not limited to, at least one of a TCP/IP, UDP, HTTP, FTP, Zig Bee, EDGE, IEEE 802.11, Li-Fi, IEEE 802.16, IEEE 802.11s, IEEE 802.11g, multi-hop communication, wireless AP, D2D communication, cellular communication protocols, and BT communication protocols.

In operation, the electronic device 102 may receive, via the user device 106, a request to access a software application associated with the vehicle 104 that may be in a first operational state. The request may indicate an intention of a user (such as the user 114 who may be associated with the user device 106) to access the software application using the user device 106. The software application may facilitate integration of the electronic device 102 with the user device 106. Specifically, the software application, when executed on the user device 106, may enable the user 114 to control one or more functions of the vehicle 104 and view information (such as a current state of charge, a tire pressure, a fuel level, incentive data, carbon saving data, reward data, and so on) associated with the vehicle 104. The software application may be configured to receive the information and render the received information.

In accordance with an embodiment, the user device 106 may transmit the request to the vehicle 104 via the wireless communication network 110. The transmitted request may include confidential information associated with the vehicle (such as a vehicle identification number (VIN) of the vehicle 104). The electronic device 102 may determine whether the VIN included in the received request matches an actual VIN of the vehicle 104. In some embodiments, the user device 106 may transmit the request to the server 108 via the communication network 112. The server 108 may compare the VIN included in the request with each VIN of a set of VINs that may be stored on the server 108. Based on the comparison, the vehicle 104 may be identified. Thereafter, the server 108 may transmit the request to the electronic device 102, via the wireless communication network 110 for a verification of the request by the electronic device 102.

The vehicle 104 may be in the first operational state when the request is received from the user device 106 or the server 108. In accordance with an embodiment, the first operational state may correspond to an OFF state of ignition of the vehicle 104. In accordance with another embodiment, the first operational state may correspond to a locked state of a door unit of the vehicle 104. The electronic device 102 may determine that the ignition is in the OFF state, or the door unit is in the locked state.

The electronic device 102 may further transmit first information to the user device 106. The first information may cause the user device 106 to render one or more action items associated with the request. In accordance with an embodiment, the transmission of the first information may be based on the reception of the request from the user device 106, and a determination that the VIN included in the request matches the actual VIN associated with the vehicle 104. The first information may be transmitted to the user device 106 via the wireless communication network 110. In some embodiments, the transmission of the first information may be based on a reception of the request from the server 108. Upon the reception of the request, the electronic device 102 may transmit the first information to the server 108 that may further transmit the first information to the user device 106 via the communication network 112.

In accordance with an embodiment, the electronic device 102 may include in the transmitted first information, an acknowledgement of the reception of the request to access the software application associated with the vehicle 104. The electronic device 102 may further include a message in the transmitted first information. The message may include a first instruction to change the operational state of the vehicle 104 from the first operational state to the second operational state and a second instruction to keep the vehicle 104 in the second operational state for a predefined time-interval (e.g., few minutes).

In accordance with an embodiment, the second operational state may correspond to an ON state of ignition of the vehicle 104. Thus, the first instruction may require the user 114 to change the state of the ignition of the vehicle 104 from the OFF state to the ON state. The second instruction may require the user 114 to keep the ignition of the vehicle 104 in the ON state for the predefined time period.

In accordance with another embodiment, the second operational state may correspond to an unlocked state of the door unit of the vehicle 104. In such a case, the first instruction may require the user 114 to change the state of the door unit of the vehicle 104 from the locked state to the unlocked state. The second instruction may require the user 114 to keep the door unit of the vehicle 104 in the unlocked state for the predefined time period.

Based on the received first information, the user device 106 may determine one or more action items that may be associated with the request. The one or more actions items may correspond to instructions (i.e., the first instruction and the second instruction) that may be included in the first information. The user device 106 may render the one or more action items on a display associated with the user device 106. Additionally, the user device 106 may render a message that instructs the user 114 to perform such action items for the verification of the request by the electronic device 102.

Based on the transmission of the first information (to the user device 106), the electronic device 102 may detect an event that may be associated with a change in the operational state of the vehicle 104 from the first operational state to the second operational state. The associated event may be detected after the transmission of the first information and may indicate the change in the operational state, such as a change from the OFF state of ignition to the ON state of ignition and sustainment of the ON state of ignition for a predefined time period. In accordance with another embodiment, the event may indicate a detection of a change in the state of the door unit, such as a change from the locked state of the door unit to the unlocked state of the door unit.

The detection of the event may be based on execution of tasks corresponding to the one or more action items (rendered by the user device 106). For example, the user 114 may perform a first action of changing the operational state of the vehicle 104 from the first operational state to the second operational state and a second action of keeping the vehicle 104 in the second operational state for the predefined time-interval. The user 114 may view two action items, viz., a first action item and a second action item rendered on the display associated with the user device 106. Upon approaching the vehicle 104, the user 114 may execute the first action item by turning ON an ignition switch in the vehicle 104 or unlock the door unit. Prior to the execution, the vehicle 104 may be in a parked state in which the door unit of the vehicle 104 may be in the locked state or the ignition of the vehicle 104 may be in the OFF state. Thereafter, the user 114 may execute the second action item by keeping the ignition of the vehicle 104 in the ON state for a predefined time-interval or keeping the door unit of the vehicle 104 in the unlocked state for the predefined time-interval.

The electronic device 102 may verify the request based on the detection of the event. The verification of the request may be performed within the predefined time-interval. The user 114 may be provided with the access to the software application based on the verification of the request. In accordance with an embodiment, the user 114 may be a first owner of the vehicle 104. The user device 106 may be associated with the first owner and the verification of the request may be performed to add the first owner as an authorized user of the software application.

In accordance with an embodiment, the electronic device 102 may receive a signal from the user device 106 via a wireless network interface (such as a Bluetooth® interface) of the vehicle 104. The wireless network interface may receive the signal from the user device 106, via the wireless communication network 110. Upon the reception of the signal, the electronic device 102 may detect that the user device 106 is at a location that is within a communication range of the vehicle 104. The detection of the location of the user device 106 with respect to the vehicle 104 may be prior to, concurrent with, or post the detection of the event associated with the change in the operational state of the vehicle 104. The verification of the request may be based on the detection of the user device 106 within the communication range of the vehicle 104. For example, the electronic device 102 may determine that the user device 106 is inside the vehicle 104.

The electronic device 102 may further transmit to the user device 106, second information that may confirm the verification of the request. The second information may be rendered on the display associated with the electronic device 102 and may indicate that the request is successfully verified. The user 114 may, thereafter, access the software application using the user device 106.

In some scenarios, the user device 106 may be associated with a second owner (not shown) that is different from the first owner (i.e., the user 114) of the vehicle 104. The detection of the event (based on which the request is verified) may be based on execution of the one or more action items by the second owner. In such scenarios, the verification of the request may be performed to add the second owner as an authorized user of the software application. The addition of the second owner as the authorized user may lead to removal of the first owner (i.e., the user 114) as the authorized user of the software application. Thus, the request may lead to a transfer of access rights over the software application from the first owner to the second owner. In some instances, the second user may be added as an authorized user without the removal of the first user. In such scenarios, the first owner may be a treated as a primary owner and the second owner may be treated as a secondary owner. The access rights of the second owner for the software application may or may not be limited compared to that of the first owner.

Figure 2:
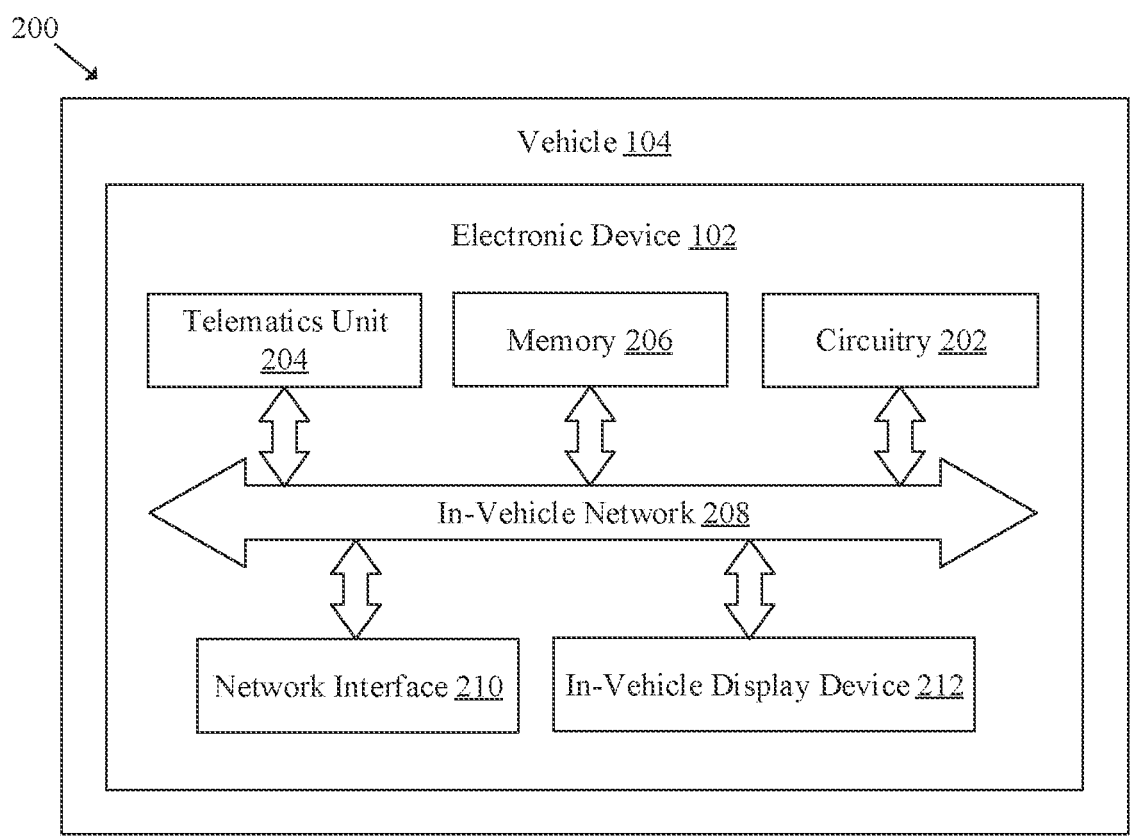
FIG. 2 is a block diagram that illustrates an exemplary electronic device that verifies ownership of a vehicle for providing access to vehicle data and software to a user device, in accordance with an embodiment of the disclosure.

FIG. 2 is a block diagram that illustrates an exemplary electronic device that verifies ownership of a vehicle for providing access to vehicle data and software to a user device, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a telematics unit 204, a memory 206, an in-vehicle network 208, a network interface 210, and an in-vehicle display device 212. The circuitry 202 may be communicatively coupled to the telematics unit 204, the memory 206, the network interface 210, and the in-vehicle display device 212, through the in-vehicle network 208 of the electronic device 102 or the vehicle 104.

The circuitry 202 may include suitable logic, circuitry, and/or interfaces that may be configured to execute program instructions associated with different operations to be executed by the electronic device 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the electronic device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The telematics unit 204 may include suitable logic, circuitry, and/or interfaces configured to control tracking, diagnostics, and communication of the electronic device 102 of the vehicle 104 with each of the user device 106 and the server 108. The telematics unit 204 may include a location sensor (for example, a global positioning system (GPS) unit) that may provide a location of the vehicle 104. The telematics unit 204 may further include one or more interfaces for communication, for example, Global System for Mobile Communications (GSM) interface, General Packet Radio Service (GPRS) interface, Long-Term Evolution (LTE) interface, or New Radio (NR) interface. The telematics unit 204 may further include one or more processing units, for example, a microcontroller, a microprocessor, a field programmable gate array (FPGA), and the like.

The memory 206 may include suitable logic, circuitry, interfaces, and/or code that may be configured to store the set of instructions executable by the circuitry 202. In accordance with an embodiment, the memory 206 may store the request that may be received from the user device 106 to access the software application associated with the electronic device 102. The memory 206 may further store the first information that may be generated by the circuitry 202 as a response to the received request. In at least one embodiment, the memory 206 may store a set of templates for a set of action items and the predefined time-interval. The set of templates and the predefined time-interval may be used for generation of instructions that may be included in the first information for transmission to the user device 106 or the server 108. One or more action items of the set of action items may be required to be performed for the verification of the request. Example implementations of the memory 206 may include, but may not be limited to, Random Access Memory (RAM), Read Only Memory (ROM), Hard Disk Drive (HDD), a Solid-State Drive (SSD), a CPU cache, and/or a Secure Digital (SD) card.

The in-vehicle network 208 may include a medium through which the various control units, components, and/or systems (for example, the circuitry 202, the telematics unit 204, the network interface 210, and the in-vehicle display device 212) of the vehicle 104 may communicate with each other. In accordance with an embodiment, in-vehicle communication of audio/video data may occur by use of Media Oriented Systems Transport (MOST) multimedia network protocol of the in-vehicle network 208 or other suitable network protocols for vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, (such as the vehicle 104). The in-vehicle network 208 may facilitate access control and/or communication between the circuitry 202 and the telematics unit 204.

Various devices or components in the vehicle 104 may connect to the in-vehicle network 208, in accordance with various wired and wireless communication protocols. Examples of the wired and wireless communication protocols for the in-vehicle network 208 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I2C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The network interface 210 may include suitable logic, circuitry, interfaces, and/or code that may facilitate a communication between the electronic device 102 (i.e., the vehicle 104) and the user device 106 via the wireless communication network 110 and a communication between the electronic device 102 (i.e., the vehicle 104) and the server 108 via the communication network 112. The network interface 210 may implement known technologies to support wired and/or wireless communication via a wireless communication network. The network interface 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n, 802.11p), voice over Internet Protocol (VOIP), Wi-MAX, a protocol for email, instant messaging, and/or Short Message Service (SMS).

The in-vehicle display device 212 may include suitable logic, circuitry, interface, and/or code that may be configured to render various types of information associated with the vehicle 104 and the user device 106, and/or viewable content (such as information content and entertainment content) via a user interface (UI) of the vehicle 104. The UI may be a customizable or a non-customizable Graphical UI that may display various types of information associated with to the vehicle 104 and the user device 106. Examples of the in-vehicle display device 212 may include, but are not limited to, a display of the infotainment head unit, a projection-based display, a see-through display, and/or an electro-chromic display. In an embodiment, the in-vehicle display device 212 may be implemented as one of, but not limited to, Multi-Information Display (MID), an automotive Head-Up Display (HUD), or an instrument cluster.

The functions of the electronic device 102 or operations executed by the electronic device 102, as described in FIG. 1, may be performed by the circuitry 202. Operations executed by the circuitry 202 are described in detail, for example, in the FIG. 3A, FIG. 3B, and FIG. 3C.

Figure 3A:
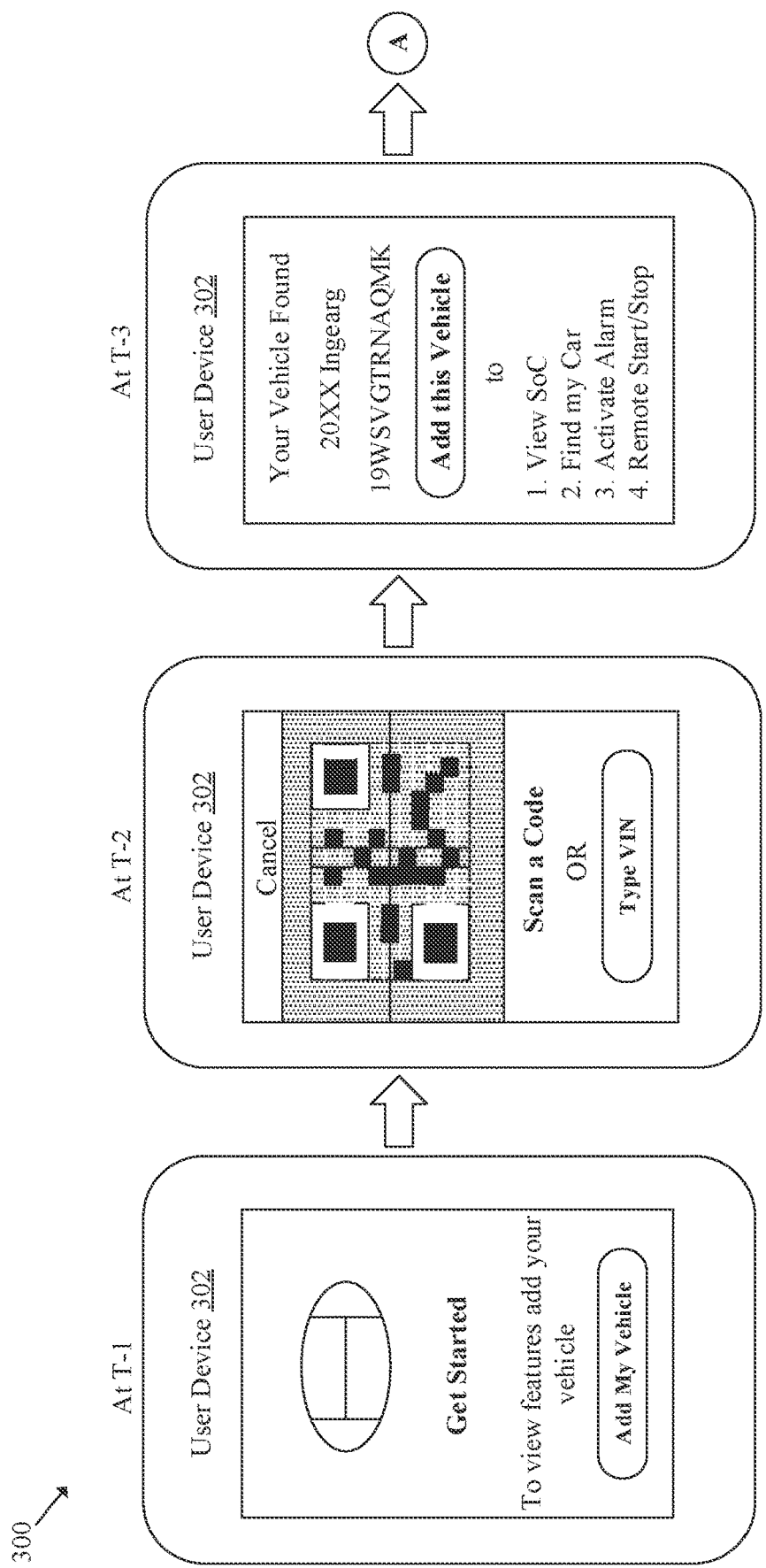
FIGS. 3A, 3B, and 3C are exemplary scenario diagrams that illustrate verification of ownership of a vehicle and granting of access to vehicle data and software based on the verification, in accordance with an embodiment of the disclosure.
Figure 3B:
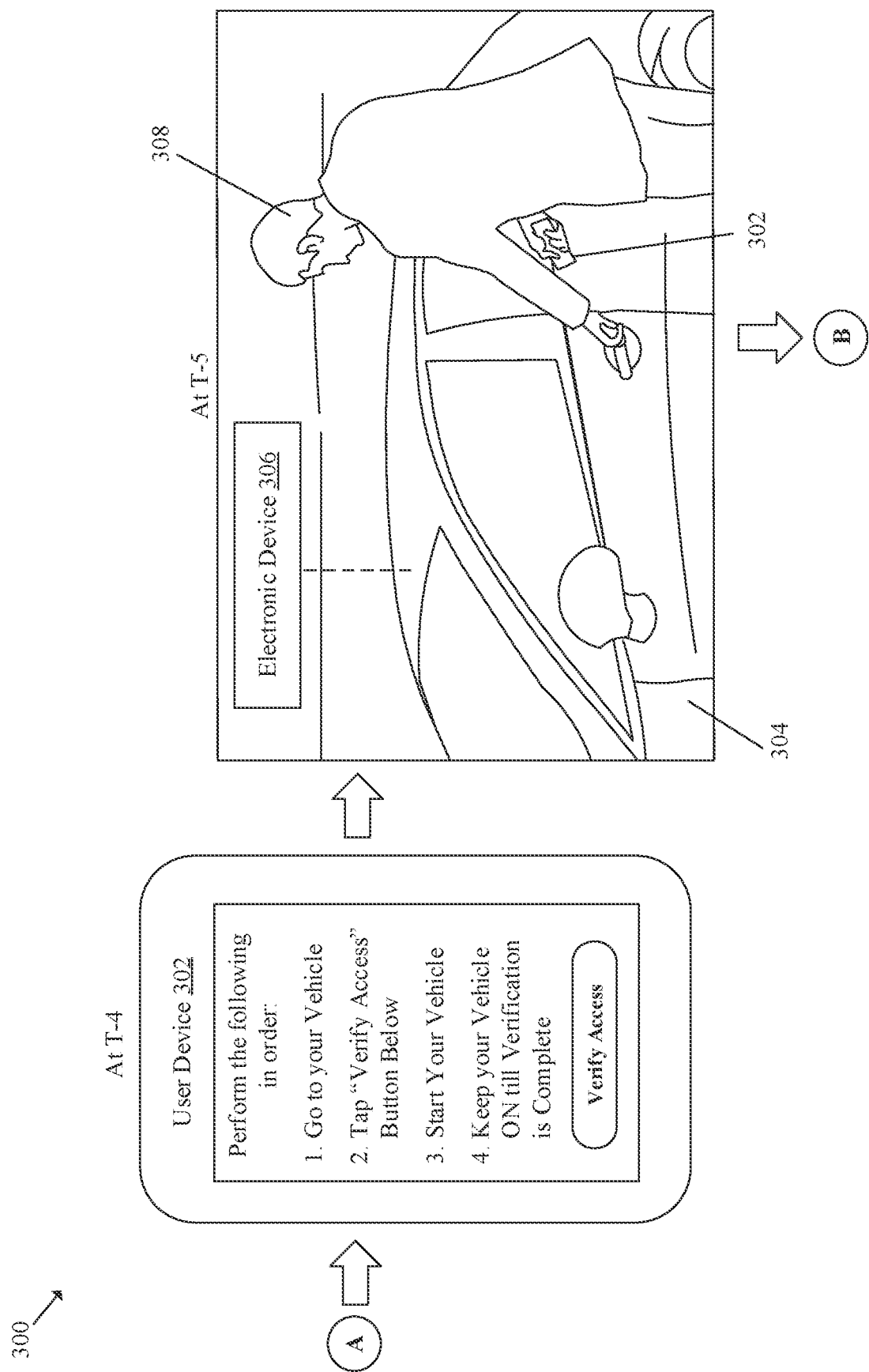
Figure 3C:
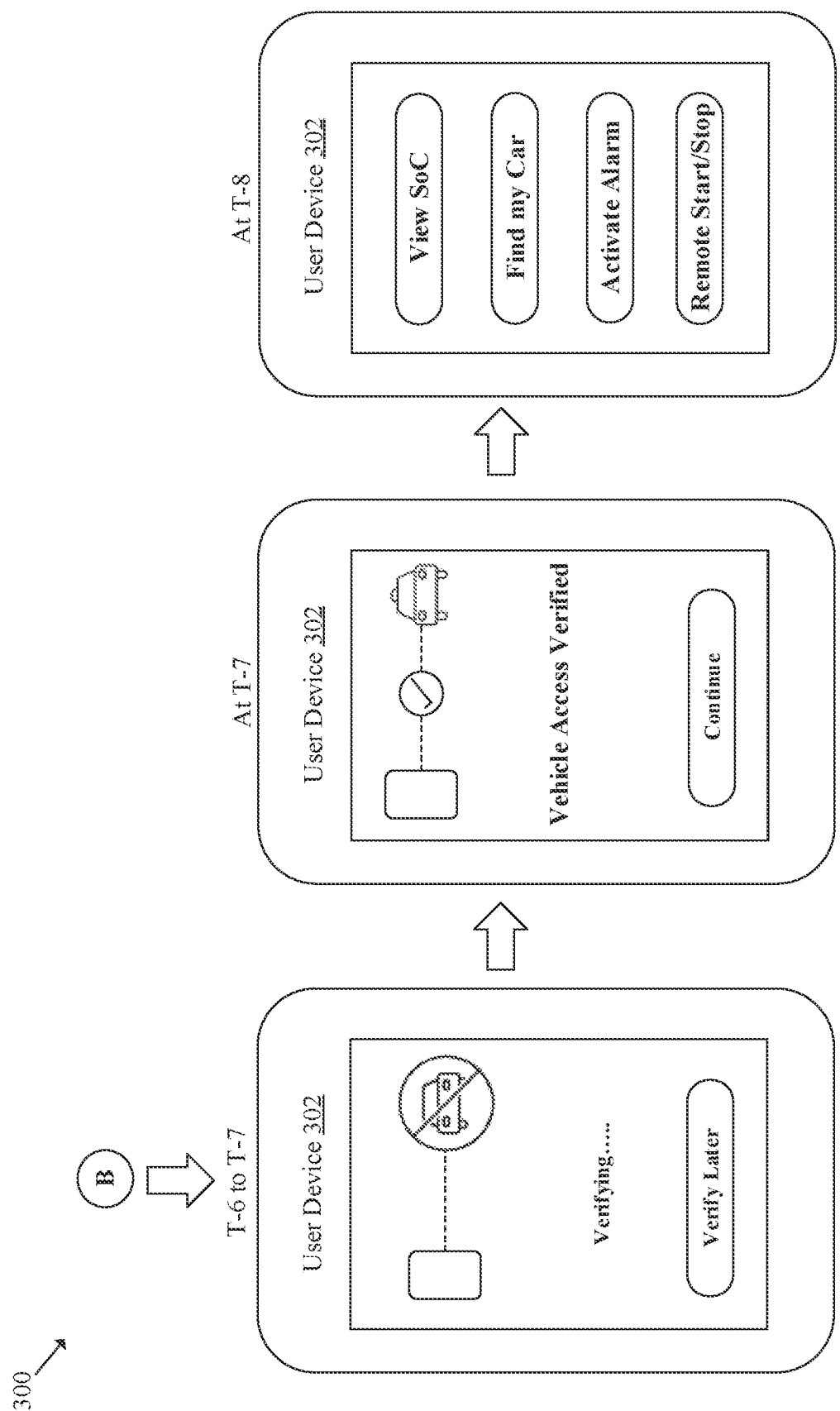

FIGS. 3A, 3B, and 3C are exemplary scenario diagrams that illustrate verification of vehicle ownership and granting of access to vehicle data and software based on the verification, in accordance with an embodiment of the disclosure. FIGS. 3A, 3B, and 3C are explained in conjunction with elements from FIG. 1 and FIG. 2. With reference to FIGS. 3A, 3B, and 3C, there is shown an exemplary scenario diagram 300. In the exemplary scenario diagram 300, there is shown a user device 302 (for example, a smartphone) and a User Interface (UI) of a web client. The web client may be installed on the user device 302 and may provide access to a software application associated with a vehicle 304 (see FIG. 3B) via the UI. The software application may be executable on the user device 302 via the web client. The UI may be a Graphical User Interface (GUI) of that may include UI elements via which user inputs may be received for control of certain vehicle functions and viewing of vehicle-related information. The UI of the web-client is shown at different time-instants. There is further shown an electronic device 306 included in the vehicle 304 and a user 308 (see FIG. 3B). The user device 302 may be associated with the user 308.

The user device 302, the vehicle 304, and the electronic device 306 are exemplary implementations of the user device 106, the vehicle 104, and the electronic device 102, respectively. The functionalities of the user device 302, the vehicle 304, and the electronic device 306 may be identical to that of the user device 106, the vehicle 104, and the electronic device 102, respectively. The vehicle 304 may be in a first operational state that may correspond to an OFF state of ignition of the vehicle 304 or a locked state of a door unit of the vehicle 304.

At time-instance T-1 (FIG. 3A), the web client may render a UI associated with the software application. The UI may include a first UI element "Add my Vehicle", via which the UI may receive user inputs (from the user 308). Based on a reception of a user input via the first UI element at time-instance T-2, the web client may render a UI that allows (i.e., provides an option to) the user 308 to scan a QR code or enter a VIN, for example. As shown in FIG. 3A, the user 308 may have scan the QR code. Based on the scan at time-instance T-3, the web client may render a UI. The rendering may be performed based on a match between the scanned QR code and a QR code associated with the vehicle 304. The UI may include information (such as a model name and a model number) that may be used to identify the vehicle 304. The UI may further include a second UI element "Add this Vehicle" that may be configured to receive a user input corresponding to a request to access the software application associated with the vehicle 304. The UI may further include a set of features of the software application that may be accessible via the UI. For example, the set of features may include "View SoC (State of Charge)" "Remote Start/Stop", "Find my Car", and "Activate Alarm". The set of features may enable the user device 302 to retrieve real-time information (such as the SoC or the location) associated with the vehicle 304 and control one or more elements of the vehicle 304 (such as by starting or stopping the vehicle 304 or activating the alarm system that may control the horn or headlights). The features may be unlocked based on a successful verification of the request that may be received via the second UI element "Add this Vehicle".

Based on reception of a user input via the second UI element, the user device 302 may transmit to the electronic device 306, a request to access the software application associated with the vehicle 304. Based on reception of the request, the circuitry 202 may transmit first information to the user device 302. The first information may include an acknowledgement of reception of the request and a message. The message may include a first instruction to change the operational state of the vehicle 304 from the first operational state (i.e., the OFF state of ignition or the locked state of the door unit) to a second operational state and a second instruction to keep the vehicle 304 in the second operational state for a predefined time-interval. The second operational state that may correspond to an ON state of ignition or an unlocked state of the door unit. Thus, the first instruction may instruct the user 308 to turn ON the ignition or unlock the door unit, whereas the second instruction may instruct the user 308 to keep the ignition turned ON or the door unit unlocked for the predefined time-interval. Upon transmitting the first information the circuitry 202 may determine whether a signal is received from the user device 302, via a wireless network interface (i.e., the network interface 210) of the vehicle 304. The reception of the signal may lead to a detection that the user device 302 is at a location that is within a communication range of the vehicle 304.

The reception of the first information may cause the user device 302, at time-instance T-4 (see FIG. 3B), to render by use of the web client, a UI that may include one or more action items associated with the request. The user device 302 may determine that the one or more actions may need to be performed by the user 308 for execution of the first and second instructions included in the message (received by the user device 302 as part of the first information). For example, the one or more actions may be "1. Approach your vehicle", "2. Tap "Verify Access" Button below", "3. Start your Vehicle", and "4. Keep your vehicle ON till Verification is complete". The user device 302 may determine that performance of the four abovementioned actions may lead to the execution of the first instruction to turn ON the ignition and the keep the ignition turned ON for the predefined time-interval. The UI may further include a third UI element "Verify access" via which a user input may be received.

The user 308 may view the four actions rendered on the UI and may approach the vehicle 304 with the user device 302 at time-instance T-5. The user 308 may be required to approach the vehicle 304 with the user device 302 since without the user device 302, the user may not be able to perform the action of tapping the "verify access" button (i.e., the third UI element). Upon reaching the vehicle 304 with the user device 302, a signal may be received from the user device 302. Based on the reception of the signal, the circuitry 202 may detect that the user device 302 is within the communication range of the vehicle 304. The user device 302 may be detected to be within the communication range if the user device 302 is near the vehicle 304 or inside the vehicle 304. After approaching the vehicle 304, the user 308 may provide a user input by tapping the third UI element "Verify access". Thereafter, the user 308 may unlock the door unit of the vehicle 304 and start the vehicle 304 by turning ON the ignition. On reception of the user input via the third UI element, the circuitry 202 may detect that the door unit of the vehicle 104 has been unlocked and that there is a change in ignition state from the OFF state of ignition to the ON state of ignition. Based on the detection at time-instance T-6 (see FIG. 3C), the circuitry 202 may send a message to the user device 302 that may indicate that the process of verification of the request has started.

At this time-instance (i.e., T-6) of detection of the change in the state of ignition, the circuitry 202 may initiate a counter that may be set to expire after the elapsing of the predefined time-interval. For example, the predefined time-interval may begin at the time-instance T-6 and may end at time-instance T-7. The user 308 may ensure that the ignition is in the ON state for the predefined time-interval, i.e., the time-interval between T-6 and T-7. During the predefined time-interval (see FIG. 3C), the user device 302, by use of the web client, may render a UI to indicate that the request is being verified and that the user device 302 does not have access to the software application associated with the vehicle 304. Thus, the request may be verified during the predefined time-interval.

At the time-instance T-7, the circuitry 202 may detect an event that may be associated with the change in an operational state of the vehicle 304 from the first operational state to a second operational state. Based on the detection of the event, the circuitry 202 may verify the request to access the software application associated with the vehicle 304 by use of the user device 302. The verification may also be based on the detection of the user device 302 within the communication range of the vehicle 304. The electronic device 306 may verify the request to add the user 308 as an owner of the vehicle 304 and an authorized user of the software application. Upon verification of the request, the circuitry 202 may transmit second information to the user device 302. The second information may confirm the verification of the request. On reception of the second information, the user device 302, by use of the web client, may render a UI that may indicate that the request is verified and that user device 302 given access to the software application associated with the vehicle 304. The UI may further include a fourth UI element "Continue" that may be configured to receive a user input. Based on reception of a user input via the fourth UI element at time-instance T-8, the web client may render a UI that includes a set of UI elements. The set of UI elements may provide access to the set of features of the software application associated with the vehicle 304, via the UI of the web client executable on the user device 302.

Figure 4:
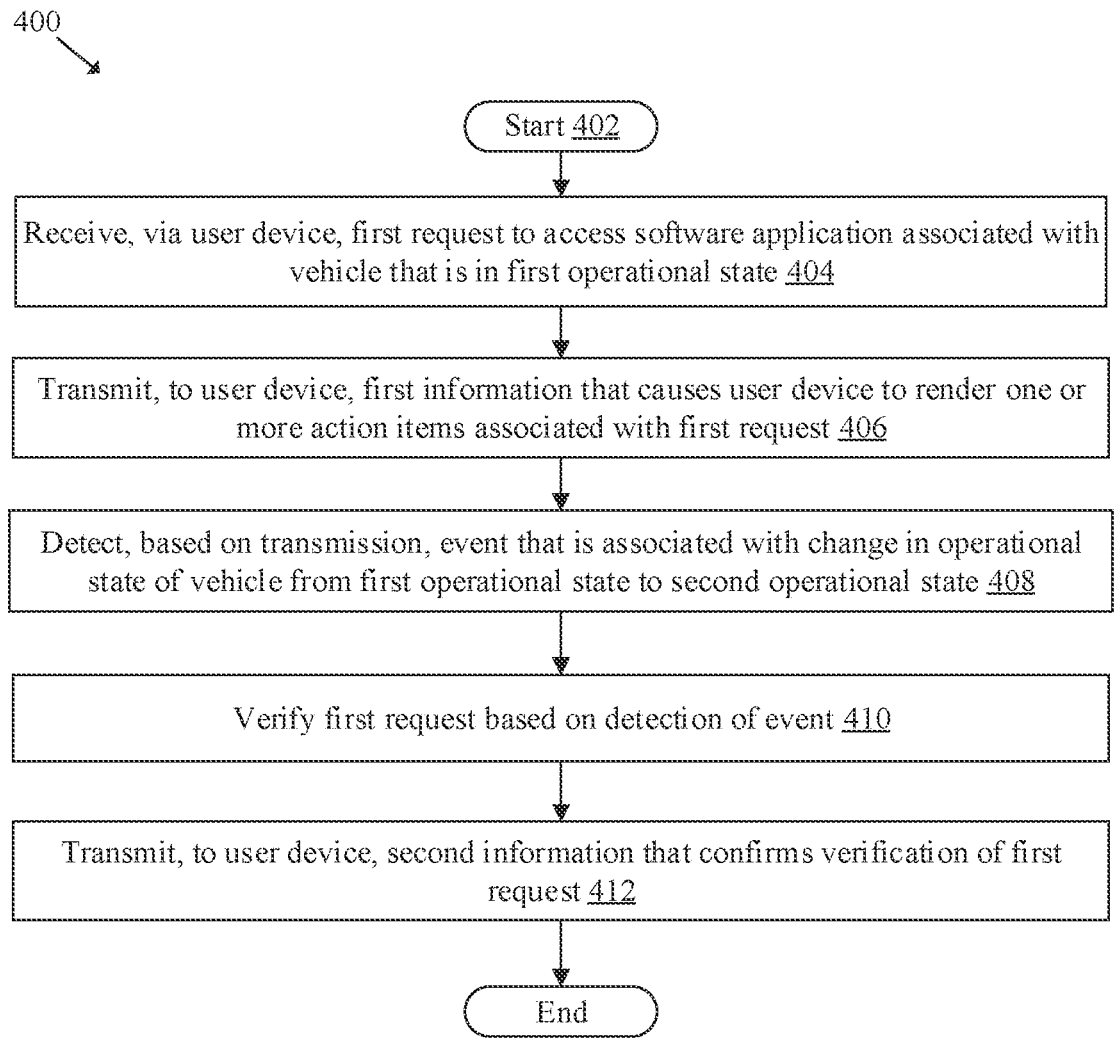
FIG. 4 is a flowchart that illustrates exemplary operations for verification of vehicle ownership for accessing vehicle data and software, in accordance with an embodiment of the disclosure.

FIG. 4 is a flowchart that illustrates exemplary operations for verification of vehicle ownership for accessing vehicle data and software, in accordance with an embodiment of the disclosure. With reference to FIG. 4, there is shown a flowchart 400. The flowchart 400 is described in conjunction with elements from FIG. 1, FIG. 2, FIG. 3A, FIG. 3B, and FIG. 3C. The operations from 402 to 412 may be implemented, for example, by the electronic device 102 of FIG. 1 or the circuitry 202 of FIG. 2. The operations of the flowchart 400 may start at 402 and proceed to 404.

At 404, a request to access a software application, associated with a vehicle (such as the vehicle 104) that may be in a first operational state, may be received via a user device (such as the user device 106). In at least one embodiment, the circuitry 202 may receive, via the user device 106, the request to access the software application associated with the vehicle 104 that may be in the first operational state. Details about the reception of the request are described, for example, in FIG. 1 and FIGS. 3A-3C.

At 406, first information, that may cause the user device 106 to render one or more action items associated with the received request, may be transmitted to the user device 106. In at least one embodiment, the circuitry 202 may transmit to the user device 106, the first information that may cause the user device 106 to render the one or more action items associated with the request. Details about the transmission of the first information are described, for example, in FIG. 1 and FIGS. 3A-3C.

At 408, an event associated with a change in an operational state of the vehicle 104 from the first operational state to a second operational state may be detected based on the transmission of the first information. In at least one embodiment, the circuitry 202 may detect, based on the transmission of the first information, the event that may be associated with the change in the operational state of the vehicle 104 from the first operational state to the second operational state. Details about detection of the event associated with the change in the operational state of the vehicle 104 are described, for example, in FIG. 1 and FIGS. 3A-3C.

At 410, the request may be verified based on the detection of the event associated with the change in the operational state of the vehicle 104. In at least one embodiment, the circuitry 202 may verify the request based on the detection of the event associated with the change in the operational state of the vehicle 104. Details about verification of the request are described, for example, in FIG. 1 and FIGS. 3A-3C.

At 412, second information, that may confirm the verification of the request, may be transmitted to the user device 106. In at least one embodiment, the circuitry 202 may transmit to the user device 106, the second information that may confirm the verification of the request. Details about transmission of the second information are described, for example, in FIG. 1 and FIGS. 3A-3C. Control may pass to the end.

Although the flowchart 400 is illustrated as discrete operations, such as 404, 406, 408, 410, and 412, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of computer-implemented instructions executable by a machine and/or a computer (such as the electronic device 102) for verification of vehicle ownership for accessing data and software associated with a vehicle (such as the vehicle 104). The set of instructions may be executable by the machine and/or the computer to perform operations that may include reception, via a user device (such as the user device 106), of a request to access software associated with the vehicle 104 that may be in an OFF state. The operations may further include transmission, to the user device 106, of first information that may cause the user device 106 to render a verification request. The operations may further include detection, based on the transmission of the first information, of a change in an operational state of the vehicle 104 from the OFF state to an ON state. The operations may further include confirmation of the request on detection of the change in the operational state. The operations may further include transmission, to the user device 106, of second information that may confirm verification of the request to access the software.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

What is claimed is:

1. An electronic device, comprising:
   circuitry that:
   receives, via a user device, a request to access a software application associated with a vehicle that is in a first operational state;
   transmits, to the user device, first information that causes the user device to render one or more action items associated with the request;
   after the transmission of the first information, detects an event that is associated with a change in an operational state of the vehicle from the first operational state to a second operational state, wherein the event results from a user-initiated physical operation at the vehicle;
   verifies the request only if the event is detected after the request and before the vehicle enters the second operational state; and
   transmits, to the user device, second information that confirms the verification of the request.

2. The electronic device according to claim 1, wherein the user device is associated with a first owner, and the verification of the request is performed to add the first owner as an authorized user of the software application.

3. The electronic device according to claim 1, wherein the circuitry further:
   receives a signal from the user device via a wireless network interface of the vehicle; and
   detects the user device at a location that is within a communication range of the vehicle,
   wherein the verification of the request is further based on the detection of the user device within the communication range.

4. The electronic device according to claim 1, wherein the user device is associated with a second owner that is different from a first owner of the vehicle, and the verification of the request is performed to add the second owner as an authorized user of the software application.

5. The electronic device according to claim 1, wherein the first information includes:
   an acknowledgement of the request, or
   a message that includes a first instruction to change the operational state of the vehicle from the first operational state to the second operational state and a second instruction to keep the vehicle in the second operational state for a predefined time-interval.

6. The electronic device according to claim 5, wherein the verification is performed within the predefined time-interval.

7. The electronic device according to claim 1, wherein the first operational state corresponds to an OFF state of ignition of the vehicle and the second operational state corresponds to an ON state of ignition of the vehicle.

8. The electronic device according to claim 7, wherein the change in the operational state of the vehicle corresponds to a change from the OFF state of ignition to the ON state of ignition.

9. The electronic device according to claim 1, wherein the first operational state corresponds to a locked state of a door unit of the vehicle and the second operational state corresponds to an unlocked state of the door unit.

10. The electronic device according to claim 9, wherein the change in the operational state of the vehicle corresponds to a change from the locked state to the unlocked state.

11. A method, comprising:
    in an electronic device:
    receiving, via a user device, a request to access a software application associated with a vehicle that is in a first operational state;
    transmitting, to the user device, first information that causes the user device to render one or more action items associated with the request;
    after the transmission of the first information, detecting an event that is associated with a change in an operational state of the vehicle from the first operational state to a second operational state, wherein the event results from a user-initiated physical operation at the vehicle;
    verifies the request only if the event is detected after the request and before the vehicle enters the second operational state; and
    transmitting, to the user device, second information that confirms the verification of the request.

12. The method according to claim 11, wherein the user device is associated with a first owner, and the verification of the request is performed to add the first owner as an authorized user of the software application.

13. The method according to claim 11, further comprising:
    receiving a signal from the user device via a wireless network interface of the vehicle; and
    detecting the user device at a location that is within a communication range of the vehicle,
    wherein the verification of the request is further based on the detection of the user device within the communication range.

14. The method according to claim 11, wherein the first information includes:
    an acknowledgement of the request, or
    a message that includes a first instruction to change the operational state of the vehicle from the first operational state to the second operational state and a second instruction to keep the vehicle in the second operational state for a predefined time-interval.

15. The method according to claim 14, wherein the verification is performed within the predefined time-interval.

16. The method according to claim 11, wherein the first operational state corresponds to an OFF state of ignition of the vehicle and the second operational state corresponds to an ON state of ignition of the vehicle.

17. The method according to claim 16, wherein the change in the operational state of the vehicle corresponds to a change from the OFF state of ignition to the ON state of ignition.

18. The method according to claim 11, wherein the first operational state corresponds to a locked state of a door unit of the vehicle and the second operational state corresponds to an unlocked state of the door unit.

19. The method according to claim 18, wherein the change in the operational state of the vehicle corresponds to a change from the locked state to the unlocked state.

20. A non-transitory computer-readable medium having stored thereon computer implemented instructions that, when executed by an electronic device, causes the electronic device to execute operations, the operations comprising:
- receiving, via a user device, a request to access software associated with a vehicle that is in an OFF state;
- transmitting, to the user device, first information that causes the user device to render a verification request;
- after the transmission of the first information, detecting a change in an operational state of the vehicle from the OFF state to an ON state;
- verifying the request only if the change in the operation state is detected after the request and before the vehicle enters into the ON state; and
- transmitting, to the user device, second information that confirms the request.

* * * * *